United States Patent [19]

Bibl et al.

[11] Patent Number: 4,706,605

[45] Date of Patent: Nov. 17, 1987

[54] SELF-CLEANING ELECTROSTATIC COLOR PRINTER

[75] Inventors: Andreas Bibl, Los Altos; Gene F. Day, Cupertino; Higginson, John A., Santa Clara, all of Calif.

[73] Assignee: Precision Image Corporation, Redwood City, Calif.

[21] Appl. No.: 861,522

[22] Filed: May 9, 1986

Related U.S. Application Data

[63] Continuation-in-part of Ser. No. 796,872, Nov. 12, 1985, Pat. No. 4,655,165, which is a continuation-in-part of Ser. No. 763,040, Aug. 6, 1985.

[51] Int. Cl.$^4$ .............................................. B05B 5/00
[52] U.S. Cl. .................................. 118/631; 118/630; 118/645; 118/647; 118/652; 118/660; 118/662
[58] Field of Search ............... 118/647, 630, 631, 645, 118/652, 660, 662

[56] References Cited

U.S. PATENT DOCUMENTS

| | | | |
|---|---|---|---|
| 4,102,306 | 7/1978 | Ohta | 118/658 |
| 4,157,219 | 6/1979 | Ohta et al. | 355/10 |
| 4,398,817 | 8/1983 | Nishimura et al. | 355/4 |
| 4,449,475 | 5/1984 | Schinke | 118/645 |
| 4,482,242 | 11/1984 | Moraw et al. | 355/10 |
| 4,627,705 | 12/1986 | Landa et al. | 355/4 |

Primary Examiner—Bernard D. Pianalto

[57] ABSTRACT

An electrostatic color picture having a single toning shoe for successively and sequentially applying color liquid developers to a color latent image overlay to a sheet disposed against a rotating drum. An electrostatic head scans the sheet in a helical pattern of abutting stripes and forms the latent image on the sheet. A toning shoe assembly follows the head and applies one of the color developers to the sheet. A drain selector foot, pivotable beneath the toning shoe, brings an appropriate developer recycling tube into communication with a drain in the toning shoe assembly for returning used developer to the correct supply tank. After scanning the sheet, the toning shoe is rinsed with a solvent at a cleaning station past the end of the drum. The toning shoe has a plurality of pressure responsive reed valves, each communicating with one of a plurality of channels in the shoe for selecting sequential color developers until the entire image is toned in repeated passes of the single toning shoe.

14 Claims, 16 Drawing Figures

SELF-CLEANING ELECTROSTATIC COLOR PRINTER

CROSS REFERENCE TO RELATED APPLICATIONS

This application is a continuation-in-part of U.S. patent application Ser. No. 796,872 filed Nov. 12, 1985, now U.S. Pat. No. 4,655,165 which is a continuation-in-part of U.S. patent application Ser. No. 763,040, filed Aug. 6, 1985.

TECHNICAL FIELD

The invention relates to apparatus for developing electrostatic color latent images and in particular to an electrostatic printer applying color fluid developers to supported sheets in order to develop multiple latent image overlays into a visible color image.

BACKGROUND ART

In electrostatic web printing or drum printing on sheets, such as in facsimile machines, an electrostatic latent image on the web or sheets is developed into a visible image, usually by applying a liquid suspension of toner particles to the sheets.

In U.S. Pat. No. 4,482,242 to Moraw et al., a latent charge image on a drum is developed by moving the drum through a pool of developer liquid in a developer holder. The excess liquid is removed by spillage off the edges of the holder, and by a fast moving roller contacting the drum.

In U.S. Pat. No. 4,157,219, Ohta et al. describe a multicolor electrostatic imaging apparatus wherein different color liquid developers are supplied to a medium bearing an electrostatic latent image. The apparatus comprises leading and trailing squeeze rollers in horizontally spaced relation, a receptacle having a plurality of valved pipes connected to respective liquid tanks for selectively applying a plurality of liquid developers and rinse liquid to the medium, and a corona charging device disposed at the rear side of the trailing roller for neutralizing or dissipating the residual charge remaining on the medium after development. These components are mounted to a reciprocating carriage so that the latent image is successively subject to developing, squeezing and charging during movement in a forward direction and to rinsing during movement in the reverse direction. Such movement is repeated some desired number of times to make a multi-colored print.

Many problems exist with conventional electrostatic printers. The supplies of developer must be frequently replaced since large amounts are applied during each printing of a sheet. The toning applicator must be prewet before it is used since it often dries out between use. Further, toning applicators, such as that in the patent to Moraw et al. above, must be periodically cleaned to remove toner particles caked or dryed onto the shoe. Since conventional toning applicators extend the width of the web or drum, they must be hand cleaned with large amounts of cleaning solvent, sometimes as frequently as once a day. This results in a considerably messy task and also results in a long time during which the printer is not in use. Color printers with multiple supplies of different color developers considerably complicate this task and may have the added problem of cross-contamination of developers.

It is an object of the present invention to provide a color printer which is self-cleaning, is immediately ready for printing without prewetting, and which provides for recycling of developer and solvent material, with a minimum of cross-contamination.

DISCLOSURE OF THE INVENTION

The above object has been met with a color printer using a single toning shoe for successively applying color liquid developers to color latent image overlays formed on a sheet supported by a rotating drum. The single "toning shoe" of the present invention is a toner applicator, resembling a tiny dish, having raised peripheral edges, which conform to the sheet and a central recessed electrode area bounded by the peripheral edges where a thin layer of flowing toner resides. Each overlay corresponds to a charge pattern for a primary color, or for black. An electrostatic head scans a sheet in a helical pattern of abutting stripes so as to write a latent image overlay pattern on the sheet. A toning shoe assembly follows the scanning head and the toning shoe in the assembly conforms to the charged surface of the sheet for applying developer. The toning shoe selectively and sequentially communicates with a plurality of supplies of color fluid developers, one per image scan of an overlay charge pattern. After each scan, a cleaning station of the printer rinses the toning shoe with a solvent. A collection funnel returns excess solvent to the solvent supply tank. The printer also has a drain selector foot which is disposed beneath the toning shoe and which pivots to position a return line to the appropriate developer supply tank under a drain of the toning shoe assembly. A number of scans is completed with toners of different colors until a composite color image has been formed.

A spillway is defined at the lowest peripheral edge of the toning shoe. In a preferred embodiment, reed valves, in a trough of the recessed area cover openings of branching channels in the shoe. Each branching channel in turn connects with one of a plurality of longitudinal main channels in the shoe in communication with supplies of fluid developer. Valves in pressurized developer supply lines to the main channels open and close to select one of the developers for injection. The reed valves open under pressure to allow the injection of developer into the recessed area.

In a second embodiment of the toning shoe a cylindrical valve or plug inside the toning shoe rotates about a longitudinal axis to select and inject one of the developers into the recessed area. The cylindrical valve has longitudinal channels formed on its surface and an equal number of chordal bores through the valve connecting the channels to inlet bores communicating with developer supply lines. Rotating the valve so that a channel is beneath a longitudinal slit in a leading edge of the recessed area causes developers to flow through the chordal bore to the channel and then out the slit to the recessed area.

An advantage of this printer is that the single toning shoe is rinsed by the cleaning station after each scan and is thus self-cleaning. Another advantage is that when the printer is not in use, the toning shoe remains in contact with the cleaning station so that it is always wet and ready for use. Caking and drying of material on the shoe do not occur. Further, the volume of the toning shoe in common use by different developers or solvent is kept very small since the toning shoe is not drum width, but only a small fraction of the width. The drain selector foot eliminates the problem of crosscontamination of the different color toners.

BEST MODE FOR CARRYING OUT THE INVENTION

Figure 1:
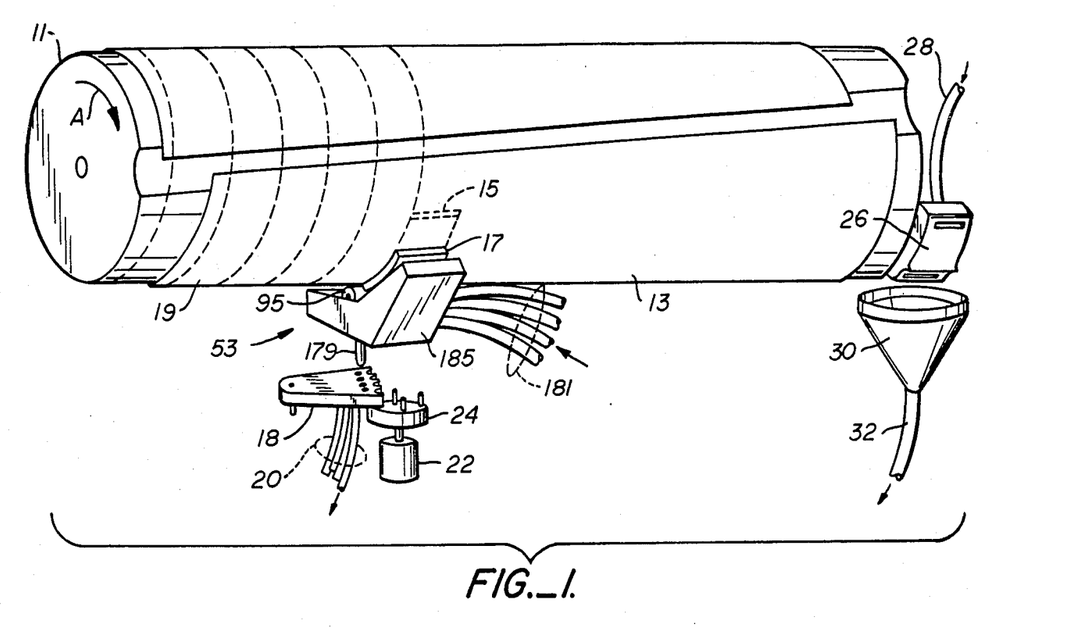
FIG. 1 is a simplified perspective view of a drum supported sheet and toning shoe assembly in accord with the present invention.

With reference to FIG. 1, drum 11 may be seen supporting a sheet of paper 13 for rotation. While the drum rotates in the direction of arrow A, its axis is fixed and so the drum does not translate laterally, only rotationally. An electrostatic head, for creating an electrostatic latent image, is in contact with the paper 13 at location 15. The head is translated laterally, parallel to the axis of the drum 11. The head has a forward edge in contact with the sheet 13, with a linear array of 1024 wires forming charging elements in very close proximity to the sheet 13. The number of wires may range between 100 and 10,000. Sheet 13 is coated so that it is a charge retaining dielectric medium. The drum operates at electrical ground or at a positive potential. The charging elements are at a negative potential of 400 to 600 volts relative to the drum. Polarities may be reversed. No electrical current is intended to flow through the paper coating.

A toning shoe 17, in a toning shoe assembly 53 following head 15, applies liquid toner to the electrostatic latent image existing in the charge pattern deposited onto the sheet for developing the image. The head and toning shoe move together laterally and continuously so that a helical stripe pattern 19, indicated by dashed lines, is traced on sheet 13 by the relative motion of the head and shoe on the one hand and the drum on the other hand. Toning shoe 17 supplies toner locally to the sheet on the stripe 19.

Toning shoe 17 is one element of a toning shoe assembly 53. Toning shoe assembly 53 also includes a drying roller 95 downstream of the toning shoe for removing excess developer from sheet 13. Both toning shoe 17 and drying roller 95 are carried within a housing 185. Developer is supplied to toning shoe 17 through inlet tubes 181. Typically there are four inlet tubes, each containing a different color of liquid developer, and toning shoe 17 selects the particular color developer to be applied to sheet 13. Excess developer is collected by a sump in housing 185 and returned to the appropriate supply of color developer via a drain tube 179, a drain selector foot 18 and one of a set of return lines 20. Drain selector foot 18 is operated by a motor 22 turning a drain selection drive 24. Drain selector 18 pivots so that the appropriate one of return lines 20 is under drain tube 179. The operation of drain selector foot 18 is discussed in greater detail below with reference to FIGS. 13 and 14.

Also shown in FIG. 1 is a cleaning station 26 located just past the right edge of drum for rinsing the toning shoe assembly 53 after each scan of a sheet 13. Cleaning solvent, such as Isopar is supplied through a tube 28 to cleaning station 26 where it is squirted into toning shoe 17. The solvent removes waste developer from toning shoe 17 and drains into a funnel 30 where it is returned via a tube 32 to a solvent supply tank. Isopar is a registered trademark of Exxon Co. for a narrow-cut isoparaffinic petroleum solvent consisting predominantly of C10 and C11 isoparaffinic hydrocarbons. Other solvents may also be used.

Figure 2:
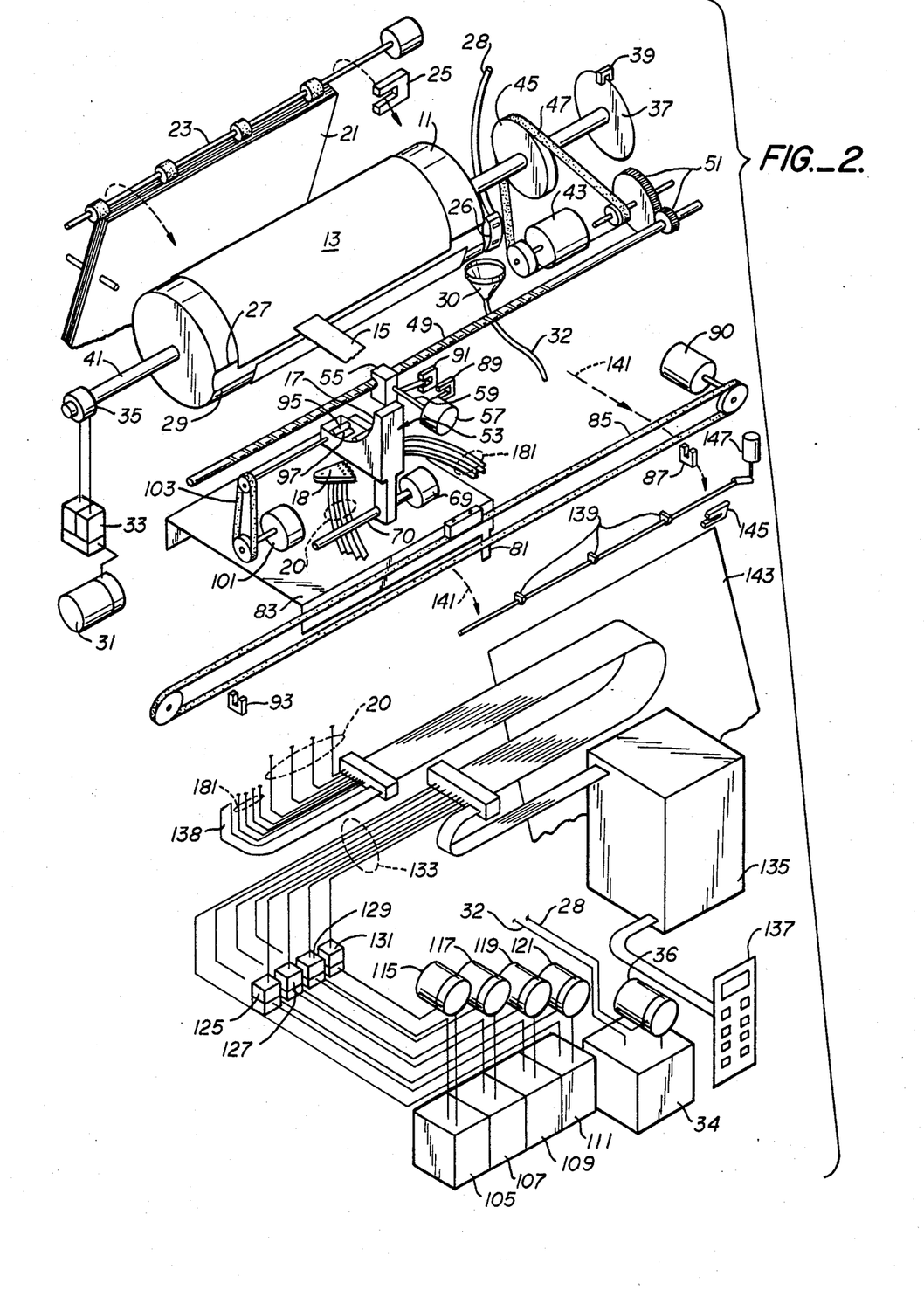
FIG. 2 is an exploded detailed plan perspective view of a printer apparatus of the present invention.

A printer employing such a toning shoe may be seen in more detail in FIG. 2. A sheet from a feeder 21 is driven by supply roller 23 through an optical sensor 25 onto drum 11. An optical sensor consists of a light transmitter and detector, separated by a narrow space. When the light beam is interrupted, the sensor is activated. The purpose of optical sensor 25 is to time the position of the edge of the sheet when a sheet first passes through the sensor. It is important to time the sheet so that the proper position of the drum can be made available to receive the sheet.

The drum may have a pair of vacuum channels 27 and 29 which are passages embedded in the drum having pumped apertures for holding sheet 13. Preferably, the channels should be spaced to secure the top and bottom edges of a sheet. The channels are evacuated by means of a vacuum pump 31 having an output controlled by solenoids 33 which is then connected through a vacuum collar 35 to the two channels 27 and 29. The first vacuum channel 27 is used to secure the top of a sheet while the other channel secures the bottom. Thus, the top channel 27 must be in approximately a 12 o'clock position to receive a sheet coming through sensor 25. The position of the drum is known from an optical encoder 37 which is a film disk having a plurality of black and clear radial stripes thereon. The marks are read by another optical sensor 39.

The diameter of drum 11 is approximately 12 inches and its width is wider than sheets to be supported. The edge of the drum, extending from slightly inside the region of where paper is to be supported may be slightly relieved to prevent edge wetting when using fluid developers. The drum is rotated about its axial shaft 41 by means of a continuously rotating motor 43 turning pulley 45 by means of belt 47. Motor 43 also turns a lead screw 49 by means of gears 51. Lead screw 49 carries the head 15 as well as toner shoe assembly 53 and platform 83. Head 15 and toner shoe assembly 53 are supported on a carrier assembly, not shown, which is connected to lead screw 49 by means of a retractable half nut 55. A solenoid 57 provides motion to an arm 59 which retracts half nut 55 from lead screw 49 on command. In the retracted position, no motion is imparted to the head, toning shoe assembly and platform by the lead screw. The retracted position is used for flyback, discussed below. At another command the solenoid 57 causes the half nut to come back into contact with the lead screw, thereby again providing motion to both the head and the toning shoe assembly.

The toning shoe assembly 53 contains a single toning shoe 17. Toning shoe 17 is approximately the same width as the head 15. A motor 69 turns another screw 70, for moving toning shoe assembly 53 directly in front of cleaning station 26 for rinsing toning shoe 17. Toning shoe 17 selectively communicates with different color developers whereby a selected toning color may be dispensed from the toning shoe.

As mentioned, the same shoe applies different colors of toner to an image. For example, the toning shoe 17 may first supply a yellow color to the latent image. After one complete scan of sheet 13 by the head 15 by movement along the lead screw 49 from left to right, the toning shoe assembly is moved by motor 69 and screw 70 to the cleaning station where it is rinsed with cleaning solvent. Solvent is supplied to cleaning station 26 from a supply tank 34. A pump 36 transmits the solvent into tube 28 which goes to cleaning station 26. A funnel 30 collects the dirty solvent and a line 32 returns the dirty solvent to the supply tank 34. After rinsing, the toning shoe is moved back in front of drum 11 and moved to the left so that a second scan of the sheet may be done. Toning shoe 17 successively supplies magenta, cyan and black liquid developer to the latent image to produce a visible color image, with the toning shoe being rinsed clean with solvent after each scan. The order in which the colors are successively applied may differ from the above.

With half nut 55 in contact with lead screw 49, the shoe assembly 53 moves to the right as head 15 scans paper on rotating drum 11. Drum rotation is at about 10 to 20 rpm. When the head reaches the right hand edge of the paper, this is detected by a finger 81 extending from platform 83 on which the shoe assembly 53 is riding. The entire assembly is being driven by half nut 55. Although the platform is connected to belt 85, the belt is not driven until the finger 81 projects into the optical sensor 87. When this occurs, half nut 55 is retracted from lead screw 49 by solenoid 57 and the retracted position is sensed by an optical sensor 89. In the retracted position, the head 15 and shoe assembly 53 are no longer driven. At this time, motor 69 is energized and screw 70 moves the toning shoe assembly 53 to the cleaning station. When cleaning is completed, motor 69 and screw 70 return toning shoe assembly 53 to a position below head 15 and flyback motor 90 is energized and belt 85 is caused to move in the opposite direction, carrying platform 83, shoe assembly 53 and head 15 back to an initial position. The arrival of platform 83 at this initial position is sensed by optical sensor 93 sensing the finger 81. When this occurs, the solenoid 57 advances arm 59 until the optical sensor 91 senses the forward position of the arm, at which half nut engages lead screw 49.

In FIG. 2, the position of the toner shoe appears shown somewhat removed from the drum. The actual position of the toning shoe is one very closely spaced to the sheet 13, a central electrode portion of the shoe being separated from the paper by only a few mils. The toning shoe carries a drying roller 95 which removes about 99 percent of the excess fluid from the sheet 13. A wiper blade 97 removes excess fluid from the drying roller 95. The remaining one to three microns of fluid on the sheet evaporates in five to twenty seconds. The roller 95 is powered by motor 101 transmitting rotary force through belt 103. Fluid developer or toner is supplied to the toning shoe from supply tanks 105, 107, 109 and 111. Pumps 115, 117, 119 and 121 transmit developer through solenoid valves 125, 127, 129 and 131 into flexible conduit 133 which goes to developer shoe 17. Each valve is a solenoid which operates at about 5 pounds per square inch of fluid pressure. Each of the supply tanks 105-111 contains a color developer or toner corresponding to the colors of toner successively supplied to shoe 17. Drain lines 20 as shown return the spent toner to the appropriate supply tank. Drain selector 18 pivots to connect the appropriate drain line to toning shoe assembly 53 to receive the spent toner.

An electrical control box 135 receives a block of digital data consisting of bits to be printed on a sheet. An operator may initiate printing through a control panel 137. The control box 135 divides the block of digital bits to be printed into columns to be sequentially transmitted to the printer one after another so that printing appears to be in the form of helical scanning of the paper, with one column continuously fed after another. A momentary pause in printing may be used in going from one column to the next at the top and bottom of a page where margins may exist or a gap in the wrap of the sheet about the drum. This may be achieved by turning valves 125, 127, 129 and 131 on and off and by interrupting the digital data being fed to write head 15. Within each column of data, the width of a column is taken as a digital word. This width corresponds to the writing width of the head. The pitch of the lead screw and the rate of rotation of the drum are synchronized so that columns abut, edge to edge, without overlap or gap. Use of liquid toner allows edges to blend so that they are not discernible in the final image. Each ditigal word is transmitted in a flat electrical cable 138 to head 15. A digital word, consisting of say 1,024 bits is transmitted to the head. A source of high voltage applied to the head allows the binary bits to be converted to electrical charge transferred onto sheet 13 by the linear array of wires in the head. Paper to be written upon is treated with a dielectric substance for charge retaining purposes. Such papers are commercially available, for example "Electrographic Paper" sold by Crown Zellerbach Corporation.

After printing a series of columns, which appear to be helical stripes and then toning with a developer of a first color, the head is caused to fly back for a second pass. After this is complete, the head is caused to fly back for a third scan with developer of the third color. Finally, upon completion of this scan, the head is again caused to fly back and then again scan across the paper applying toner of the fourth color. The toner shoe is rinsed after each scan at cleaning station 26. Toners associated with primary colors may be used to form a color printed image. After the fourth pass, paper is released from drum 11 by releasing vacuum in the channels 27 and 29 and by moving the pickoff fingers 139 into contact with the drum, thereby causing sheet 13 to slide over the pickoff fingers as indicated by the dashed arrows 141 and sheet 143. Passage of the sheet 143 past the pickoff fingers is sensed by an optical sensor 145. The pickoff fingers are moved by a solenoid 147 which can adjust the fingers to move into ejection position once printing is complete. Control panel 137 has various status indicators for signalling printing progress as well as manual override controls for interrupting printer operation or resetting the printing. Control box 135 also sends commands to servo motor 22 in FIGS. 7 and 14 for selecting the appropriate recycle tube 20 with drain selector foot.

Figure 3:
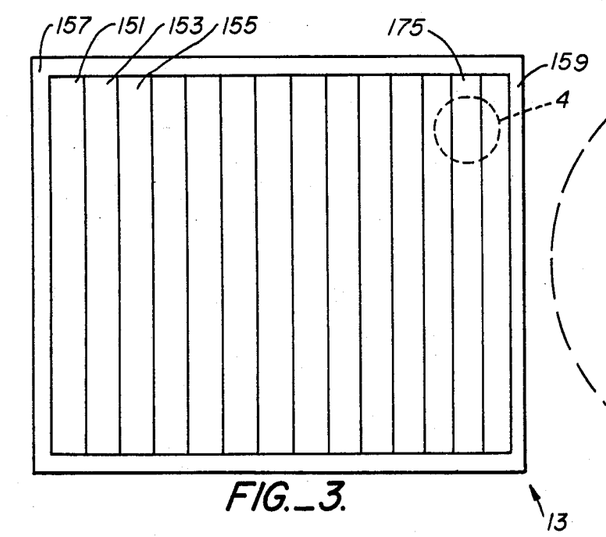
FIG. 3 is a layout view of a sheet illustrating the scanning pattern of the apparatus of the present invention.

FIG. 3 shows a sheet 13 consisting of columns 151, 153, 155, 175 and so on. A page margin 157 exists on the left hand side and a page margin 159 exists on the right hand side. In these page margins, no printing exists. The area of the paper accessible for printing must be a multiple of the width of the head. In the example of FIG. 3, fourteen columns are shown, each column being the width of the head. To print sheet 13 fourteen revolutions of the drum per color would be necessary, with page margin columns 157 and 159 being blank since the head did not pass over these regions. The lateral motion of the head is smooth and continuous so that when the paper sheet is wrapped about the drum, the columns appear to be a continuous helical spiral, without any spaces or overlap in the spiral pattern.

Figure 4:
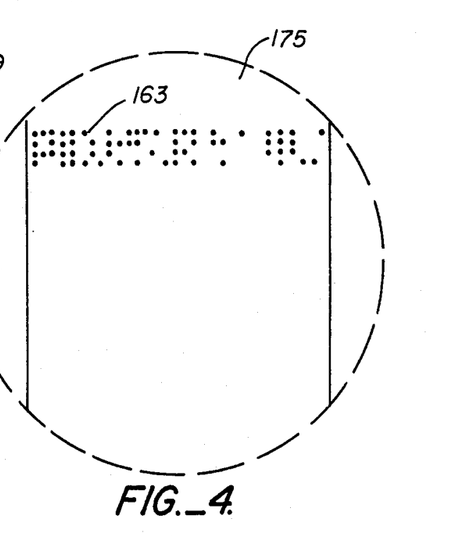
FIG. 4 is a detail of the sheet illustrated in FIG. 3.

FIG. 4 illustrates a printing sample within a column indicated by the dashed circle 4 in FIG. 3. In FIG. 4, the head and a toner shoe has moved over column 175 developing a latent image and this latent image has been toned to form a dot pattern 163, the dots appearing to be in rows and columns. The maximum number of dots possible equals the number of wire elements in the head extending from side to side. The dot pattern of FIG. 4 is merely illustrative of the writing of digital words with bit patterns which span a column from edge to edge. The bit patterns consist of the presence and absence of charge which is made visible by toning. Where charge is applied, the image is toned, giving a dark dot appearance. Since the charge is quite localized, the pattern appears to be a grid-like array of dots. Each position in the array is an image pixel which is either dark or light depending upon whether charge was deposited in an array location.

Figures 5, 7, 8:
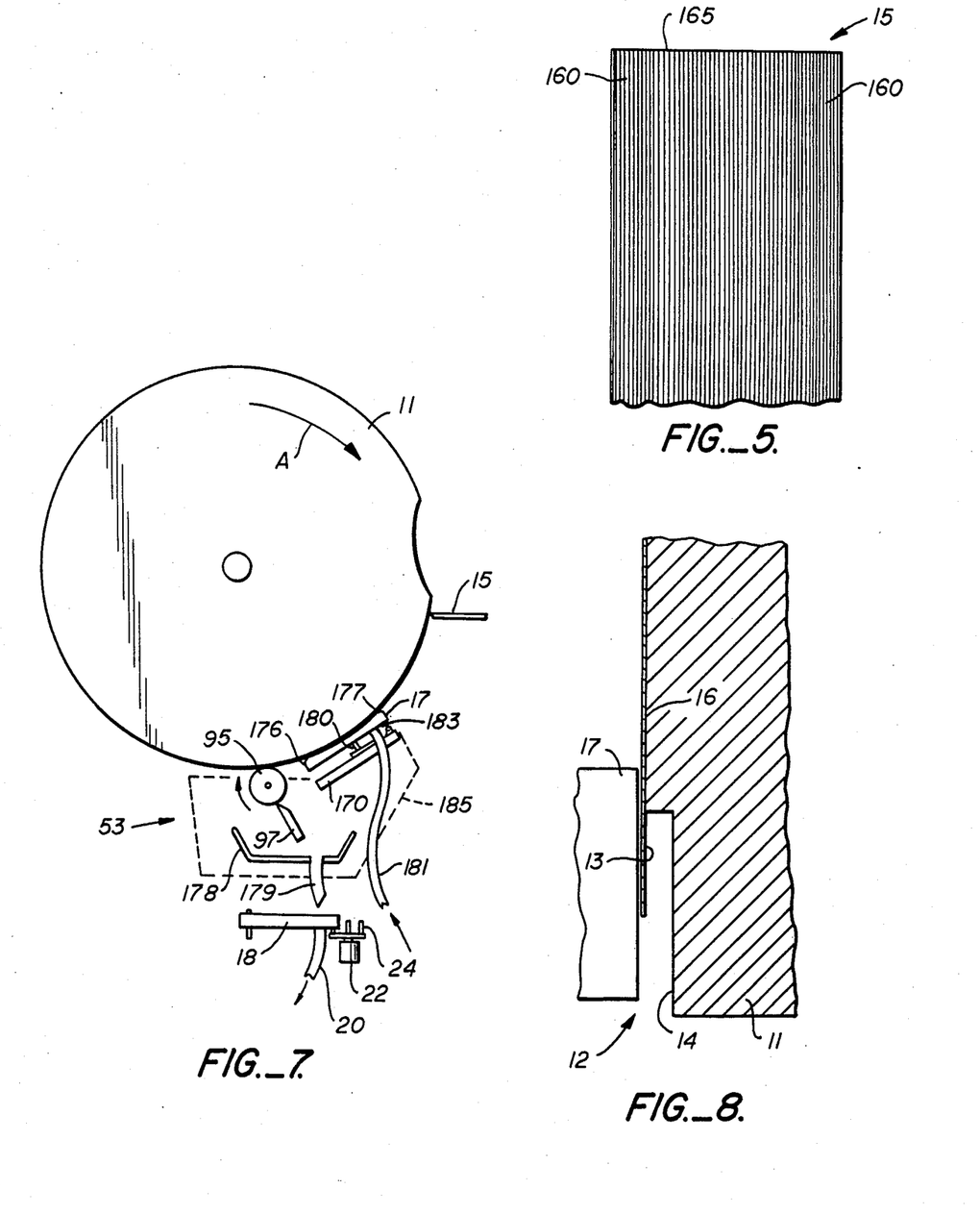
FIG. 5 is a partial top view of a scanning head employed in the printer of FIG. 2.
FIG. 7 is a side plan view of a sheetsupporting, rotating drum with a print head and toning shoe assembly.
FIG. 8 is a sectional view of an edge of the drum of FIG. 7, with a sheet supported thereon and a toning shoe adjacent to the sheet.
Figure 6:
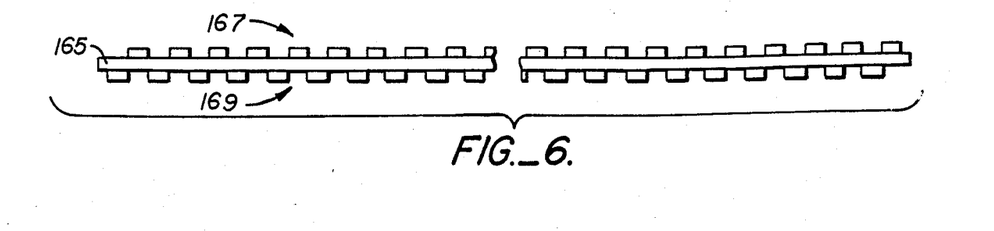
FIG. 6 is a magnified front edge view of the scanning head illustrated in FIG. 5.

FIG. 5 shows that the head 15 consists of a series of very fine wires 160 deposited on a very thin circuit board 165. It is possible to use charging elements other than wires, but in this case wires present a manufacturing advantage. The wires extend completely across the board, on upper and lower surfaces. This is illustrated in FIG. 6 where the board 165 is seen end-on. It has an upper set of wires 167 and a lower set of wires 169. The board itself is only about 2.5 mils thick. The wires or charging elements are positioned at a density of more than 150 wires per centimeter or about 400 wires per inch, with 512 wires per side and an air or other insulative gap between adjacent wires so that they do not short each other out. As may be seen, the two sets of wires are slightly offset from each other, with a total of 1024 wires on two sides. This number is selected because it is convenient for digital processing. The wires 167 and 169 are parallel, mutually insulated traces which are produced on board 165 using well-known photolithographic techniques. One of the advantages of the present invention is that the head used herein is relatively inexpensive compared to line printer heads and other full width electrostatic heads which are very expensive.

In FIG. 7, the drum 11 is seen to be rotating in the direction indicated by the arrow A. The electrostatic head 15 is in mechanical contact with a paper sheet mounted on the drum, applying charge thereto. A toning shoe 17, having an arcuate peripheral shape facing the drum applies toner to a localized area corresponding to a column or a latent image stripe. The latent image created by the head 15 is thus toned and formed into a visible image. A biasing mechanism 170 pushes toning shoe 17 into contact with the sheet mounted on drum 11. Preferably, toning shoe is suspended on a pin 180 of biasing mechanism 170 at a single point at the back of the toning shoe. Toner applied at an upper portion 177 of the shoe 17 is allowed to flow downward along a central recessed area of the shoe between the sheet and the shoe and then fall past spillway 176 into a sump 178 for collection through drain tube 179. Drain tube 179 is pointed so drops of developer do not remain suspended in drain tube 179. New developer is supplied through one of the inlet tubes 181 and flows through the wall of the shoe to a supply port 183 where the supply of developer is replenished and injected into the shoe for application to the sheet. The drying roller 95 is seen to be carried within the same housing 185 as the shoe and contacts drum 11 for removing excess developer. Once the excess is removed, it is scraped from the drying roller by a scraper blade 97. Again, excess developer falls into the sump 178 for collection and recycling. Developer in sump 178 drains through drain tube 179 and is returned to the appropriate supply container through one of the toner recycling tubes 20. Selector 18 operated by motor 22 via drive 24 brings the appropriate recycling tube 20 into communication with drain tube 179.

Typically, the circumferential surface of drum 11 is smooth across the entire drum width. Alternatively, the edges of the drum may have a recessed surface as seen in detail in FIG. 8. An edge 12 of the drum 11 has a recessed shoulder 14 which is approximately one-eighth inch below the principal drum surface 16. The sheet of paper 13 overhangs the main drum surface 16 by a fraction of an inch. If the toning shoe 17 passes over overhanging portion of sheet 13, excess developer will run down the face of the shoe and avoid contact with drum 11. Without the presence of the recessed shoulder, developer might enter the small space between sheet 13 and drum 11 and by capillary action spread onto the back side of sheet 13 and onto the main drum surface, causing a buildup of toner on the drum. This leads to deterioration of the drum surface, since a residue of toner particles accumulates on the drum. The recessed shoulder portion 14 exists on opposite sides of the drum.

Figure 9:
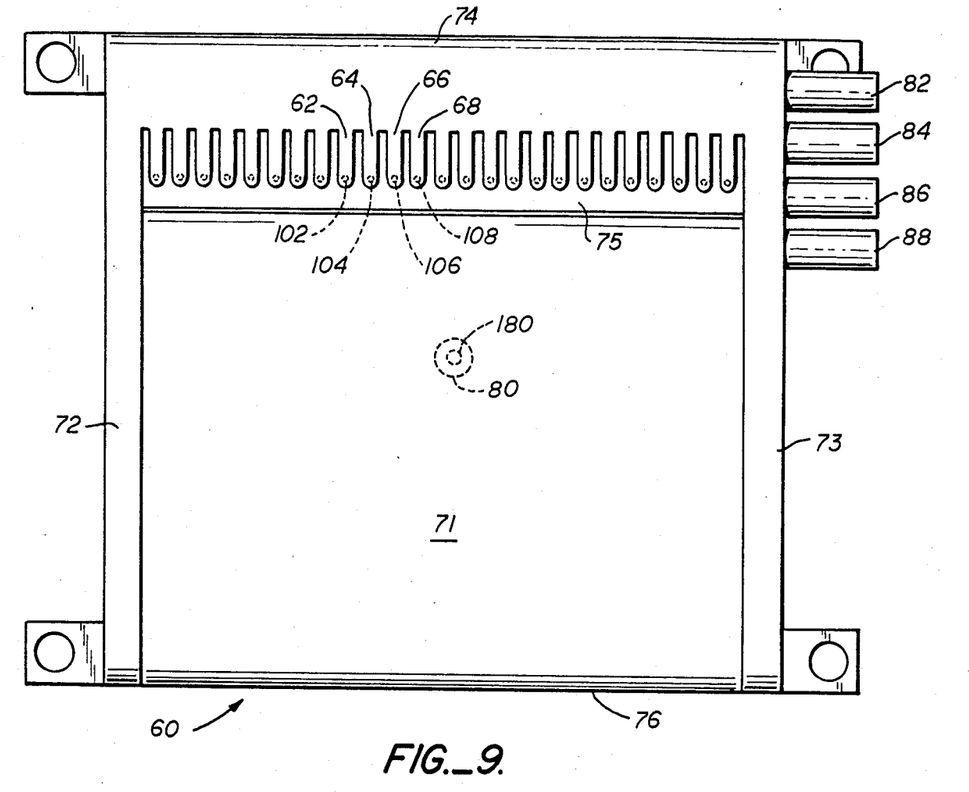
FIG. 9 is a front view of a first embodiment of a toning shoe in accord with the present invention.
Figure 10:
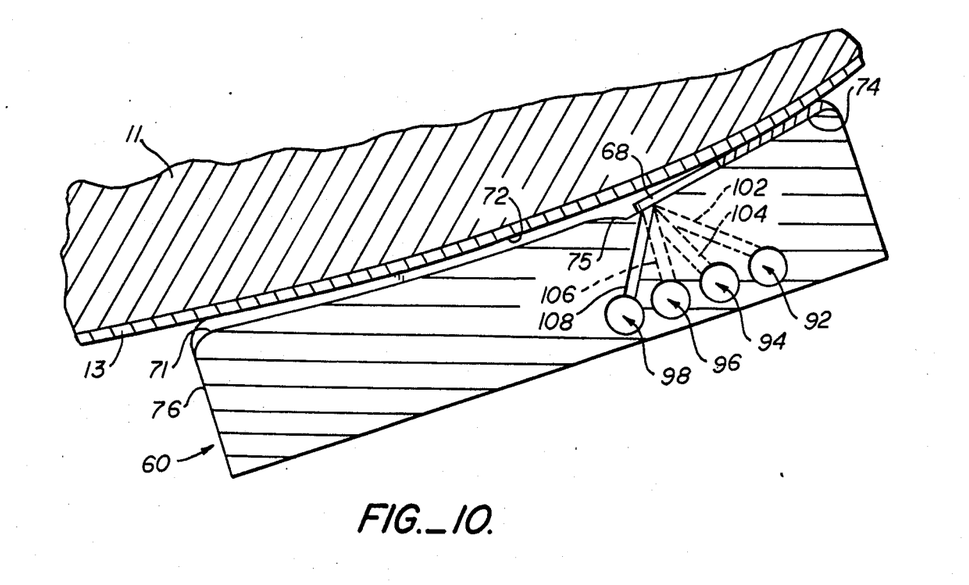
FIG. 10 is a side sectional view of the toning shoe of FIG. 9.

In FIGS. 9 and 10, a detail of a preferred toning shoe 60, capable of selectively applying different colors of fluid developer, is seen. The shoe 60 has a U-shaped shim attached to a top surface of the shoe forming raised peripheral edges or rims 72, 73 and 74. Reed valves, such as valves 62, 64, 66 and 68, extend from upper rim 74 which is seen as the upper or leading edge. The shim is typically attached to shoe 60 by adhesive bonding at rims 72, 73 and 74. The reed valves are not bonded to shoe 60. Within the boundary formed by rims 72, 73 and 74 is a central recessed electrode portion 71. A shallow trough 75 with a smooth contour is formed in the top surface of shoe 60 prior to attaching the shim. The trough 75 extends across the leading edge of recessed portion 71 under and just beyond the reed valves. The reed valves, such as valves 62, 64, 66 and 68 rest on a flat part of trough 75 which is tangent to the cylindrical surface 71 at the upper end of the reed valves. A spillway 76 drains applied liquid developer from a trailing peripheral edge opposite upper rim 74. Shoe 60 is preferably supported against a sheet 13 or a drum 11 by a pin 180 of a biasing mechanism as seen in FIG. 7. A detent 80 at the back of shoe 60 in FIG. 9 receives pin 180.

Electrode area 71 is typically 2 inches long and 2.56 inches wide. Rims 72 and 73 are typically 3/16 inch wide. Upper rim 74 is typically about ½ inch wide. The rims 72, 73 and 74 project upward less than 10 mils (254 μm), typically about 4 or 5 mils (102 to 127 μm), from the central portion 71 creating a space for flow of a thin film of fluid developer between central portion 71 and sheet 13. The rims have an arcuate shape facing the drum 11 with a radius of curvature which equals the combined radius of drum 11 with sheet 13. Rims 72, 73 and 74 contact and conform to the shape of sheet 13 on the drum. The rims are polished to a high degree of accuracy to assume a close fit against the sheet, thereby confining developer to the localized area adjacent central portion 71 with little, if any leakage.

Toning shoe 60 in FIGS. 9 and 10 communicates with supplies of color developer through inlet lines 82, 84, 86 and 88 connected to the shoe. Typically there are four colors of developer such as yellow, magenta, cyan and black, fed through four inlet lines. A plurality of main channels 92, 94, 96 and 98, equal in number to the number of inlet lines, are bored horizontally parallel to one another through shoe 60 across the width of recessed area 71. Each main channel communicates with one of the inlet lines to receive a supply of liquid developer. A plurality of branch channels, such as 102, 104, 106 and 108, for each main channel 92, 94, 96 and 98, are bored into shoe 60 from trough 75 to the main channels. Each of the upper openings of the branch channels 102, 104, 106, 108, etc. is covered by a reed valve, as seen in FIG. 9. Typically, there are 24 reed valves and 24 branches, six valves and branches communicating with each of the four main channels.

In operation, developer is injected onto recessed electrode portion 71 under a pressure of about 1.5 psi at a rate of about 0.05 gallons per minute. Reed valves, such as valves 62, 64, 66 and 68, open in response to fluid pressure. Solenoid valves 125, 127, 129 and 131 in FIG. 2 open and close to select which inlet line 82, 84, 86 or 88 in FIG. 9 is pressurized. Developer supplied through inlet line 82, which may for example be yellow, flows under pressure through main channel 92 and six branch channels including branch 102. Six reed valves including valve 62 open in response to pressure to inject the yellow developer into trough 75 from where it flows into and through recessed portion 71. Likewise when one of the other inlet lines 84, 86 and 88 is pressurized, developer flows through a main channel 94, 96 or 98 respectively and six branch channels communicating with that main channel. Reed valves including valves 64, 66 or 68 respectively open to inject, for example, magenta, cyan or black developer into recessed portion 71. Typically, developer flows at a speed of about 16 inches per second in the space between center recessed portion 71 and the sheet.

Central electrode portion 71 is normally a grounded conductor. Developing fluid flowing in the space between electrode 71 and a sheet is subject to an electric field in those regions where charge has been deposited onto the sheet, causing toner particles suspended in the developer to be attracted to the sheet thereby creating a visible image.

Alternatively, the central electrode may be subject to a variable bias voltage to compensate for variable drum speed. At a typical maximum speed of rotation, 12 inches per second, a typical bias would be zero volts. As speed decreases negative bias increases linearly. At minimum speed, say 2 inches per second a typical bias is negative 75 volts.

For a two-inch-long toning shoe 60, a sheet on the drum is in contact with developer for one-sixth second at maximum drum speed. Drum speeds as slow as two inches per second can cause sheet-developer contact times of as long as one second, which if not compensated for cause overtoning of the sheet and image running and smearing. A bias voltage on the electrode portion 71 reduces the electric field in the space between electrode and sheet by an amount sufficient to prevent overtoning.

The rims are preferably insulating to prevent streaking. In dry weather the conductivity of the sheet under the surface insulating coating is reduced causing less charge to be deposited on the sheet. In addition, voltages induced in the paper by the toning process may cause toner particles to be deposited on the electrode portion 71 and also on the rims if the rims 72, 73 and 74 are conducting. Since, in the present invention the rims contact the sheet, streaking may result unless the rims are insulating.

If the rims are conducting they cannot be electrically biased if the central electrode is biased. Thus, either they must be electrically insulated from the central electrode (and held at ground potential), or, the central electrode must be kept at ground potential. In this case, if the drum speed drops, tending to cause overtoning, another method other than central electrode bias must be employed to prevent overtoning. A preferred such method is reduction of the toner flow rate so as to prevent overtoning.

Figure 11:
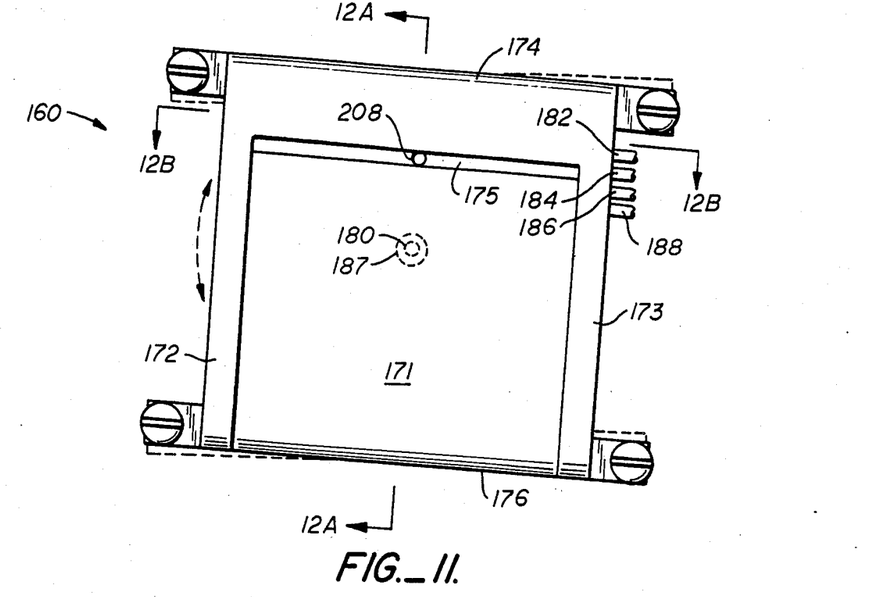
FIG. 11 is a front view of a second embodiment of the toning shoe in accord with the present invention.
Figure 12A:
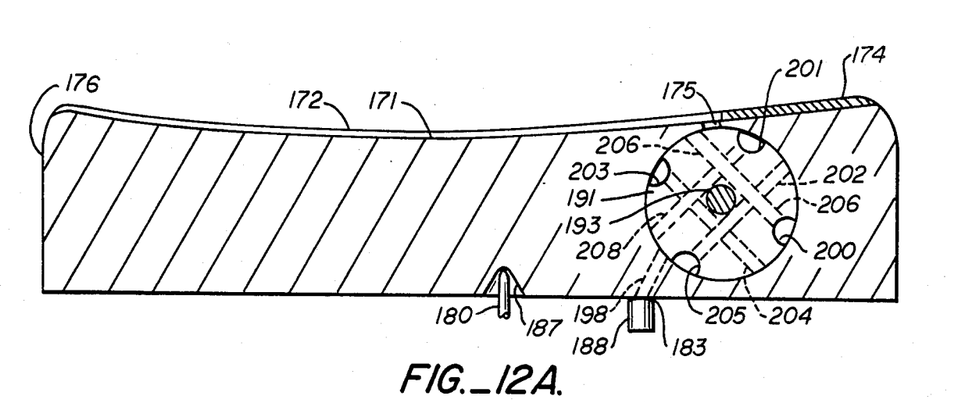
FIG. 12a is a side sectional view taken along the lines 12a—12a in FIG. 11.
Figure 12B:
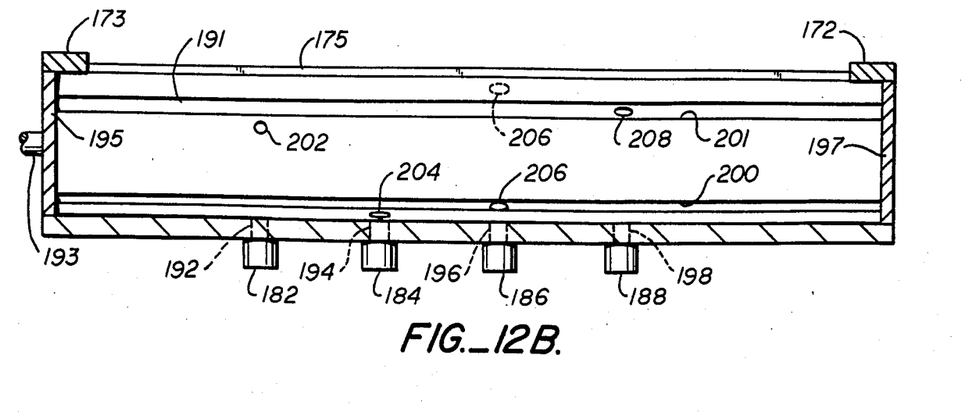
FIG. 12b is a side sectional view taken along the lines 12b—12b in FIG. 11.

In FIGS. 11, 12a and 12b, a toning shoe 160 has a shim forming peripheral edges or rims 172, 173 and 174. A spillway 176 for draining developer from toning shoe is located at a trailing edge opposite from upper rim 174. Rims 172, 173 and 174 bound a central recessed electrode region 171. Toning shoe 160 is mechanically biased against a sheet by a pin 180 as seen in FIG. 7. A detent 187 at the back of the shoe receives pin 180. Dimensions of toning shoe 160 are typically the same as those of toning shoe 60 in FIGS. 9 and 10. However, the manner in which toning shoe 160 communicates with a plurality of supplies of color fluid developer differs from that of toning shoe 60 in FIGS. 9 and 10.

Inlet lines 182, 184, 186 and 188, seen coming from the side of toning shoe 160 continue under the toning shoe and connect to shoe 160 at four laterally displaced positions on the underside thereof. Inlet bores 192, 194, 196 and 198 formed in the underside of toning shoe 160 deliver developer from inlet lines 182, 184, 186 and 188 respectively to a generally cylindrical selection valve 191. Valve 191 selectively delivers the developer in one of the bores 192, 194, 196 and 198 to a slit 175 in the top major surface of toning shoe 160 adjacent to upper rim 174. Slit 175 forms a leading edge of recessed portion 171 where developer is applied to a sheet.

Selection valve 191 is horizontally disposed inside toning shoe 160 between slit 175 and inlet lines 182, 184, 186 and 188, extends the width of toning shoe 160 and is rotatable about its longitudinal axis parallel to slit 175. An axle 193, connected to selection valve 191 on its longitudinal axis, communicates rotary power to turn selection valve 191. Four longitudinal channels 200, 201, 203 and 205 are formed in the major cylindrical surface of selection valve 191. Typically the channels are circumferentially spaced from one another by about ninety degrees. Four longitudinally spaced apart chordal bores 202, 204, 206 and 208 are bored completely through selection valve 191, beginning at longitudinal channels 205, 203, 200 and 201 respectively. Typically, the measure of the chords cut by bores is approximately 135 degrees.

Rotating selection valve 191 successively brings the various inlet lines 182, 184, 186 and 188 into communication with slit 175. For example, in FIG. 11 chordal bore 208 can be seen through slit 175. Longitudinal channel 201 to which bore 208 leads is directly beneath slit 175. Chordal bore 208 then communicates through bore 198 with inlet line 188. In FIG. 12a selection valve 191 has been rotated clockwise slightly from its position in FIG. 11, so that no inlet line communicates with slit 175. Such a position can be used as an off position when the printer is not in use.

In FIG. 12b selection valve 191 has been rotated still further so that chordal bore 206 has passed by slit 175. The longitudinal channels spread the developer arriving through the chordal bores along the width of toning shoe 160 prior to the developers emergence through slit 175 onto recessed portion 171. Preferably, longitudinal channels 200, 201, 203 and 205 have diameters about twice the diameters of chordal bores 202, 204, 206 and 208 so that a larger volume of developer can be held in the channels for proper developer spread and flow. Consequently, chordal bores, such as bore 206, should not directly communicate with slit 175 but rather communicate indirectly through the longitudinal channels, such as channel 200. Still referring to FIG. 12b continued rotation will bring chordal bore 204 into line with bore 194 and inlet line 184. When this occurs channel 203 will be directly beneath slit 175.

Figures 13, 14:
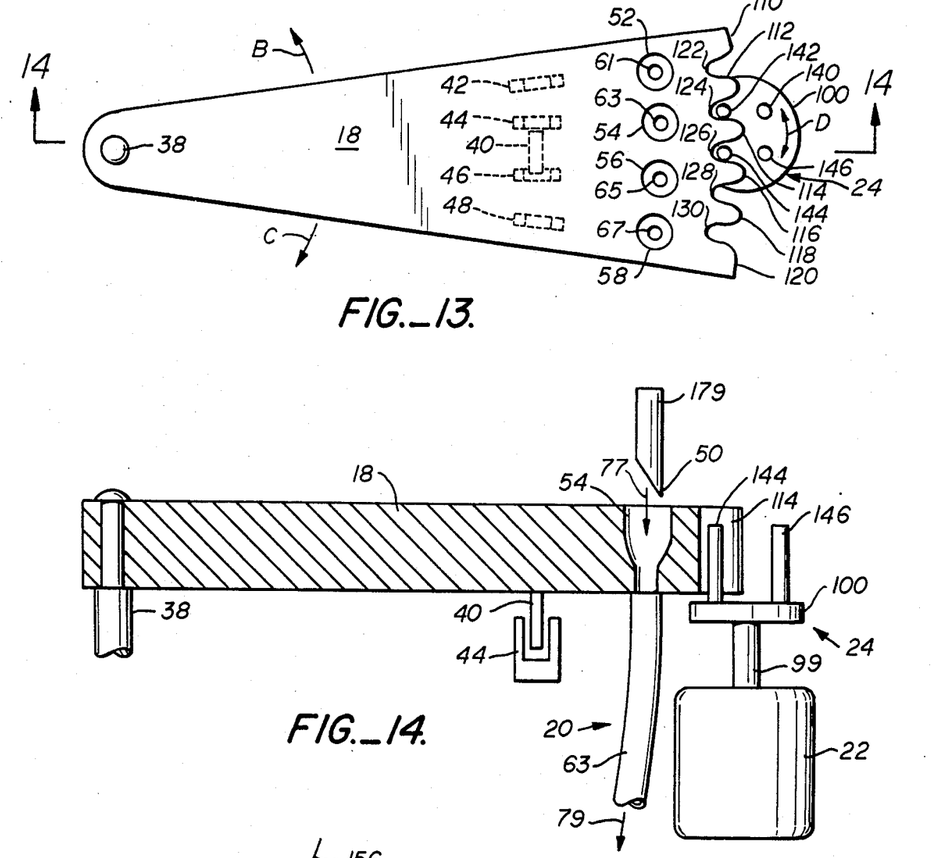
FIG. 13 is a top plan of a drain selector foot in accord with the present invention.
FIG. 14 is a side sectional view taken along the line 14—14 in FIG. 13.

With reference to FIGS. 13 and 14, a drain selector foot 18 selects a drain tube 20 such as tube 63 for returning used developer to the correct supply tank. Foot 18 is pivoted about a pivot or ankle 38 at an end of foot 18 in an either counterclockwise or clockwise direction, as indicated by arrows B and C respectively. The position of foot 18 is detected by sensors, such as optical sensors 42, 44, 46 and 48. An optical sensor consists of a light transmitter and a detector, separated by a narrow space. When the light beam is interrupted, the sensor is activated. Thus, when a finger 40 depending from foot 18 passes through a sensor the position of the foot is known.

Pivoting foot 18 brings one of four openings 52, 54, 56 and 58 through foot 18 into line directly beneath the drain tube 179 of toning shoe assembly 178. Used developer flows in the direction indicated by arrows 77 and 79 from drain tube 179 through an opening, such as opening 54 in FIG. 14, through a recycling tube, such as tube 63 in FIG. 14, back to a supply tank. Drain tube 179 is pointed like a quill to prevent drops of developer therein from staying in the drain tube 179. Each of the openings 52, 54, 56 and 58 connects to a toner recycling tube 61, 63, 65 and 67 leading back to developer supply tanks.

Foot 18 is driven into a selected position for returning developer to the appropriate supply tank by a peg disc drive 24. Peg disc drive 24 is powered by a servo motor 22 through a shaft 99 and comprises a disc 100 seated at its center on top of shaft 99 and four upstanding pegs 140, 142, 144 and 146 projecting upwardly from disc 100. Motor 22 receives commands for control box 135 seen in FIG. 2. Foot 18 has toes 110, 112, 114, 116 and 118 etc., typically six in number which extend from an end of foot 18 opposite ankle 38. The toes define spaces 122, 124, 126, 128 and 130, typically five in number between toes 110, 112, 114, 116 and 118 etc. These spaces receive pegs 140, 142, 144 and 146. Preferably, pegs 140, 142, 144 and 146 are arranged in a square on disc 100 so that every turn of ninety degrees by disc 100 brings a new peg into engagement with a space between toes. Peg disc drive 24 can turn either clockwise or counterclockwise, as indicated by arrow D. Turning drive 24 clockwise forces the lower left peg engaging foot 18, peg 144 in FIG. 13, to push against toe 114 so as to cause foot 18 to pivot in counterclockwise direction B. Likewise, turning drive 24 counterclockwise pivots foot 18 in clockwise direction. Each ninety degree turn of drive 24 brings a different opening 52, 54, 56 or 58 into position beneath drain tube 179.

Figure 15:
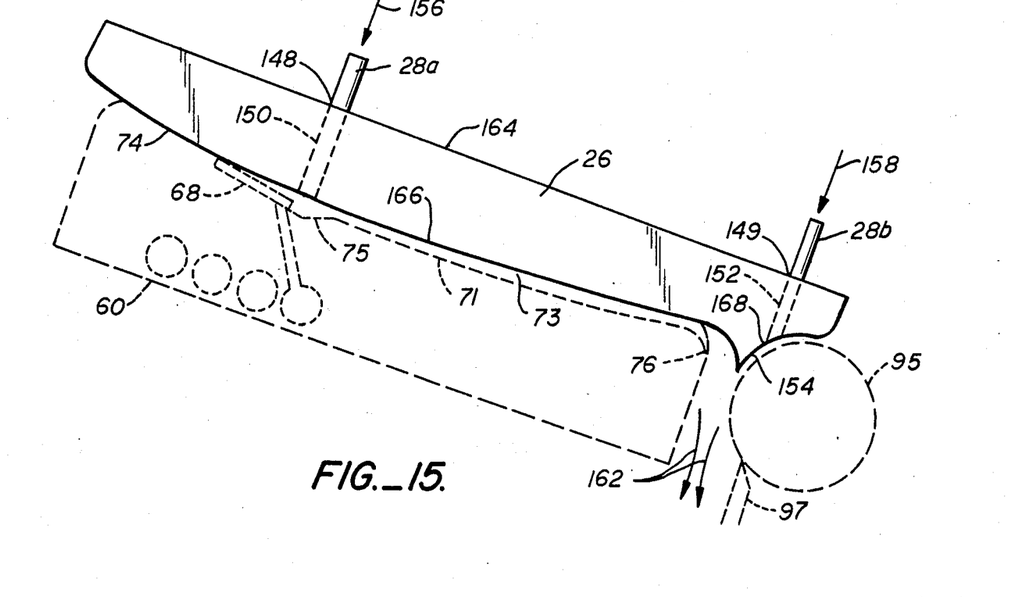
FIG. 15 is a side plan view of a cleaning station in accord with the present invention engaging the toning shoe of FIG. 9, shown in phantom, and a drying roller, also shown in phantom.

With reference to FIG. 15, a cleaning station 26 receives a cleaning solvent indicated by arrows 156 and 158, from a solvent supply tube 28 which divides into two solvent supply tubes 28a and 28b and connects to the back surface 164 of cleaning station 26 at two places 148 and 149. Channels 150 and 152 through cleaning station 26 transport solvent from supply tubes 28a and 28b to the front surface 166 of cleaning station 26. Front surface 166 is shaped to conform to a toning shoe, such as shoe 60 seen in phantom in FIG. 15. Cleaning station 26 may also receive toning shoe 160 described above. Front surface 166 is also shaped at bottom region 168 to receive drying roller 95. A ridge 154 separates the top region of front surface 166 for rinsing toning shoe 60 from bottom region 168 for rinsing roller 95. Channels 150 and 152 may incorporate cross channels, not shown, and a plurality of outlet openings at the bottom of the cleaning station 26 to more effectively spread the cleaning solvent across the width of the shoe 60 and drying roller 95.

In operation, with reference to FIGS. 15 and 2, when toning shoe assembly 53 completes a scan of a sheet 13 on a drum 11, the toning shoe 60 is retracted from the sheet. Motor 69 turns lead screw 70 to carry toning shoe assembly 53 past the end of drum 11. Toning shoe 60 engages cleaning station 26 and solvent, such as Isopar, is squirted through channel 150 to rinse the toning shoe 60. An abundance of solvent is directed into trough 75 and on to reed valves 68, then flows in this space between recessed area 71 and front surface 166 of cleaning station. Preferably, enough solvent is flowing to lift toning shoe 60 slightly off of cleaning station 60 so as to also rinse rims 72, 73 and 74. The excess solvent flows past spillway 76, as indicated by arrows 162, into a collection funnel 30 for return via drain tube 32 to the solvent supply tank 34. At the same time as toning shoe 60 is rinsed, drying roller 95 and wiper blade 97 are also rinsed with solvent from channel 152. The excess solvent thus falls into collection funnel 30. Rinsing typically lasts about one to five seconds.

After rinsing, the toning shoe 60 may be disengaged from cleaning station 26 and the toning shoe assembly 53 returned to drum 11 by motor 69 and screw 70. Half nut 55 may then be disengaged as described above to return the assembly 53 to the left for a new scan. After the last scan, however, toning shoe 60 is kept engaged against cleaning station 26 until the printer is next used. In this manner, the toning shoe is always wet and ready for use, and no caking or crusting of solvent or developer material occurs on the recessed surface 71 of toning shoe 60. This is important to insure that reed valves 62, 64, 66 and 68 etc., remain wet and that drying and crusting of toner does not cause them to stick to the flat portion of trough 75. It also insures that supply slit 175 in FIGS. 11, 12a and 12b does not become partially occluded with dry, crusted toner solids. It is also very helpful to always begin a new toning pass with a prewetted shoe so that the toner may spread quickly and uniformly throughout recessed surface 71 even before re-engagement of the shoe against the paper on the drum. This prevents possible drop-out on untoned areas at the very beginning of a toning scan.

We claim:

1. An electrostatic color printer comprising,
   drum means rotating about an axis for supporting a sheet bearing an electrostatic latent image color overlay pattern,
   means conforming to a portion of said sheet on said drum means for applying color fluid developer to said latent image color overlay pattern in a helical scan pattern of plural abutting stripes, said means having a width corresponding to said stripes and being in selective and sequential communication with a plurality of supplies of color fluid developers to form a composite color image on said sheet in a plurality of helical scans, said developers sharing a small common volume, and
   means adjacent to an end of said drum means for rinsing said means for applying fluid developer with a developer solvent after each helical scan.

2. The printer of claim 1 wherein said means for applying fluid developer comprises a toning shoe assembly having one and only one toning shoe conforming to said sheet on said drum means, said toning shoe having raised peripheral rims contacting said sheet, a central recessed electrode region bounded by said rims and spaced from said sheet, a spillway on a peripheral edge of said shoe for removing excess developer from said toning shoe and means for injecting a selected one of said color fluid developers onto said electrode region.

3. The printer of claim 2 wherein said toning shoe has valve means in communication with all of said supplies of developer for selecting said one of said color fluid developers.

4. The printer of claim 3 wherein said valve means is a cylindrical selection valve disposed inside said toning shoe and rotatable about an axle on the longitudinal axis of said valve, a slit parallel to said longitudinal axis of said valve at a leading edge of said recessed electrode region adjacent to one of said rims, a plurality of inlet bores at a back of said shoe, each bore in communication with one of said supplies of developer, a plurality of longitudinal channels on the cylindrical surface of said selection valve, and a plurality of chordal bores between said longitudinal channels and said surface of said valve, each of said chordal bores transmitting one of said color fluid developers from one of said inlet bores to one of said longitudinal channels when said one longitudinal channel is directly beneath said slit.

5. The printer of claim 2 wherein said toning shoe has a plurality of spaced apart main channels across the width of said shoe in said shoe, each of said main channels in communication with one of said supplies of developer, a plurality of longitudinally spaced apart branch channels from openings in a longitudinal trough and a leading edge of said recessed electrode region adjacent one of said rims to said main channels, and reed valves tangent to said trough covering said openings of said branch channels.

6. The printer of claim 1 wherein said means for rinsing comprises a cleaning station having a front surface with a shape conforming to said means for applying fluid developer, said cleaning station having channels therethrough to said front surface, said channels in communication with a supply of developer solvent.

7. The printer of claim 6 wherein said means for rinsing further comprises a collection funnel disposed beneath said cleaning station in communication with said supply of developer solvent for returning excess solvent to said supply.

8. The printer of claim 1 further comprising means for returning excess color developer to said supply of developer of the same color.

9. The printer of claim 8 wherein said means for returning excess color developer comprises,
   a drain selector foot disposed beneath said means for applying fluid developer, said means for applying fluid developer having means for collecting excess developer and a tube with a quill end depending from said collecting means, said foot pivotable about an ankle at one end, said foot having openings therein, each of said openings in communication with one of said supplies of developer, said openings movable directly beneath said quill end of said tube by said pivotable foot, and means for pivoting said foot.

10. The printer of claim 9 wherein said means for pivoting said foot comprises,
    a motor with a shaft,
    a drive connected to said shaft, said drive having a disk seated at a center of said disk on said shaft, said disk turnable by said motor and a plurality of upright pegs projecting from said disk, and
    toes extending from an end of said foot opposite from said ankle, said toes defining spaces therebetween, said pegs being engaged in said spaces.

11. The printer of claim 1 further comprising electrostatic head means for writing an electrostatic latent image on said sheet and means for moving said head means parallel to the drum axis in close proximity to said dielectric sheet, said motion at a rate scanning said sheet in a helical pattern of abutting stripes.

12. An apparatus for use in a color electrostatic drum printer for selectively applying color fluid developers to a color latent image overlay on a sheet supported by a backing member, the apparatus comprising,
    a shoe with raised peripheral edges conforming to the shape of a portion of a supported sheet bearing a latent image color overlay pattern, said shoe having a central recessed area surrounded by said edges, said edges contacting said sheet and having an opening defined therein forming a spillway,
    pressure means for injecting a selected one of a plurality of color fluid developers into said shoe, said developers sharing a small common volume, means for sequentially selecting and injecting one of said plurality of color fluid developers into said recessed area thereby creating a flow of developer to said spillway so as to form a composite color image on said sheet in a plurality of scans, and means for moving said shoe relative to said sheet to scan said sheet in a helical pattern of plural abutting stripes, said shoe having a width corresponding to said stripes.

13. The apparatus of claim 12 wherein said means for selecting and injecting one of said plurality of developers comprises, a cylindrical selection valve disposed inside said toning shoe, said valve rotatable about an axle on the longitudinal axis of said cylindrical valve, a plurality of longitudinal channels being formed on a cylindridcal surface of said selection valve, a plurality of longitudinally spaced apart chordal bores being formed through said valve, each of said bores extending from one of said longitudinal channels to the surface of said valve away from said channels, a slit parallel to said longitudinal axis of said valve in a leading edge of said recessed area adjacent one of said rims, and a plurality of inlet bores at a back of said shoe, each of said inlet bores receiving one of said plurality of color fluid developers, said chordal bores selectively transmitting one of color fluid developers from one of said inlet bores to one of said longitudinal channels when said one longitudinal channel is directly beneath said slit.

14. The apparatus of claim 12 wherein said means for selecting and injecting one of said plurality of developers comprises valves associated with each of said pressure means, said toning shoe having a plurality of spaced apart main channels in said shoe extending the width of said shoe, each of said main channels receiving one of said color fluid developers, said toning shoe having a plurality of longitudinally spaced apart branch channels from openings in a longitudinal trough at a leading edge of said recessed area to said main channels, said toning shoe also having a plurality of reed valves tangent to said trough covering said openings of said branch channels.

* * * * *